US008799803B2

(12) United States Patent
Amm (10) Patent No.: US 8,799,803 B2
(45) Date of Patent: Aug. 5, 2014

(54) CONFIGURABLE INPUT DEVICE

(75) Inventor: David T. Amm, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 13/039,510

(22) Filed: Mar. 3, 2011

(65) Prior Publication Data

US 2012/0227006 A1   Sep. 6, 2012

(51) Int. Cl.
*G06F 3/048* (2013.01)
*G06F 3/01* (2006.01)

(52) U.S. Cl.
CPC .. *G06F 3/048* (2013.01); *G06F 3/01* (2013.01)
USPC ............................................. 715/773; 715/771

(58) Field of Classification Search
CPC .................................. G06F 3/01; G06F 3/048
USPC .................................................. 715/773, 771
See application file for complete search history.

(56) References Cited

U.S. PATENT DOCUMENTS

| | | | |
|---|---|---|---|
| 6,570,557 B1 * | 5/2003 | Westerman et al. | 345/173 |
| 6,611,253 B1 * | 8/2003 | Cohen | 345/168 |
| 6,693,626 B1 * | 2/2004 | Rosenberg | 345/168 |
| 2008/0180654 A1 * | 7/2008 | Bathiche et al. | 356/51 |
| 2010/0214226 A1 | 8/2010 | Brown et al. | |

FOREIGN PATENT DOCUMENTS

| | | |
|---|---|---|
| WO | WO2005/065034 | 7/2005 |
| WO | WO2009/059479 | 5/2009 |

OTHER PUBLICATIONS

"LiquidKeyboard—Touch-typing on touch screens and surfaces", taken from http://www.youtube.com/watch?v=47okf4aykUg, posted Oct. 2010.*

* cited by examiner

*Primary Examiner* — William Bashore
*Assistant Examiner* — Gregory A Distefano
(74) *Attorney, Agent, or Firm* — Brownstein Hyatt Farber Schreck, LLP (57) ABSTRACT

There are provided methods and systems related to having an input device configured according to a position of a user's hand relative to the input device. In particular, in some embodiments, a method of operating a computing system is provided that includes determining an operational context of the computing system utilizing a processor of the system and configuring an input device for the system based on the operational context. The input device includes a plurality of discrete input members. The method also includes displaying a virtual image representative of the input device on a display of the system. A position of a user's digits relative to the input device is sensed and the input device is reconfigured based on the sensed position of the user's digits. An image of the user's digits overlaying the virtual image representative of the input device is provided on a display of the computing system.

19 Claims, 12 Drawing Sheets

CONFIGURABLE INPUT DEVICE

BACKGROUND

1. Technical Field

The present application relates generally to computer input devices and, more particularly, to configurable input devices.

2. Background

Some common input devices for computing systems include a keyboard, a mouse, and a trackpad. Of these, the keyboard may be the most used. Often users look down at the keyboard when they type. This is not ergonomic and may lead to neck and muscle strain. Additionally, it is generally not advantageous for accurate and/or fast typing. Specifically, when users are focused on the keyboard, they cannot tell what has been input and typically revisit the input data to edit it. Moreover, when someone accustomed to looking at the keyboard tries to view the display instead of the keyboard, errors and frustration may occur as they cannot tell where their hands are relative to the keys they want to use. Further, when alternating between a mouse (or trackpad) and the keyboard, constant re-positioning of the hands on the keyboard is generally required for proper hand placement.

SUMMARY

There are provided methods and systems related to having an input device configurable according to a position of a user's hand relative to the input device. An image of the configured input device may be displayed for a user to view. Additionally, an image of the user's hands/digits may overlay the image of the input device to indicate their relative location.

In some embodiments, a method of operating a computing system is provided that includes utilizing a processor to determine an operational context of the computing system and configuring an input device for the system based on the operational context. The input device may include a plurality of discrete input members. In some embodiments, the discrete input members may take the form of an array of sensors (e.g., touch sensors, pressure sensors, force sensors, and so forth). In other embodiments, the discrete input members may take the form of switches, such as keys of a keyboard, for example. Input received from the discrete input members may be configured so as to register as particular characters, icons, or other input based at least in part upon the location of a user's hands relative to the discrete input members. For example, in some embodiments, a resting or starting position of the hands may cause the discrete input members to be configured such that a "home row" of keys, or other conventional key arrangement, for a keyboard is aligned with the user's fingers.

The method may also include displaying a virtual image representative of the input device on a display of the system. A position of a user's digits relative to the input device is sensed and an image of the user's digits overlaying the virtual image representative of the input device is provided on a display of the computing system. In some embodiments, the image of the user's digits overlaying the virtual image shows the user's digits in positions approximating their relative location. Additionally, or alternatively, the user's digits may be shown in positions illustrating what input their digits overlay. That is, the illustrated digits may be shown as being over particular characters, icons, etc., that the discrete input devices will be interpreted as by the computing system.

In some embodiments, a computer system is provided that includes an input device having a surface utilized for providing input to the computer in response to a user input, a first sensor configured to determine a position of a user's hand relative to the surface, and a second sensor configured to determine a touch of the user's hand on the surface. The computer system also has a processor communicatively coupled with the input device and a memory communicatively coupled with the processor. A display in communication with the processor is provided and configured to receive data from the processor to provide a virtual image of the user's hand overlaying an image of the input device. The image of the input device shows discrete input members and an image representing the user's hands overlaying the image of the input device. The displayed discrete input members are aligned at least in part based on the determined position of the user's hand relative to the surface.

In still other embodiments, a computer system is provided having a processor, a memory communicatively coupled to the processor, and a plurality of sensors communicatively coupled to the processor. The plurality of sensors are configured to sense a position of a user's digits relative to a surface of the computer system and to sense an input from a user. A display of the computer system is configured to show an image representing a virtual input device and the user's digits overlaying the image representing the input device. The virtual input device includes a plurality of discrete virtual buttons configured to correspond in location with the sensed position of the user's digits.

While multiple embodiments are disclosed, other embodiments will become apparent to those skilled in the art from the following Detailed Description. As will be realized, the embodiments are capable of modifications in various aspects, all without departing from the spirit and scope of the embodiments discussed herein. Accordingly, the drawings and detailed description are to be regarded as illustrative in nature and not restrictive.

DETAILED DESCRIPTION

Computer systems having configurable inputs that may be configured at least in part based on a relative position of a user's hand are provided. Additionally, the computer systems may be configured for displaying an image of the input device with a user's hand/digits overlaying the input device. The overlaying image of the user's hand/digits is shown when the user's hands are proximately located to an input device or surface. Further, the user's hand position may be used to configure the input device. Discrete sensors for sensing contact and/or input may be programmable in software so that input received from a particular member is interpreted as a specific input by the computer system based on the configuration of the input device.

As the computer system provides a virtual image of the input device, ergonomics may be improved. That is, a user may simply view the display screen to see the relative location of their hands to the input device and its virtual buttons.

In some embodiments, the input device may include a surface with which a user interacts. The surface may have sensors associated with it to sense proximity and location of a user's hand/digits relative to the surface. Additionally, the sensors may be configured to sense contact and/or input by a user. In some embodiments, contact by a user may be determined to be input based on the amount of pressure applied and/or a change in pressure being applied, among other things.

Utilizing a surface as the input allows for application-specific keyboards/input devices to be implemented. For example, the surface may be utilized as an input device for gaming, providing game specific inputs. Moreover, when used as a keyboard, all keys are programmable, allowing for function keys, international keyboards, capitals, numerics, and so forth. Further, fewer keys may be provided in some embodiments and each key may be programmable for multiple functions (e.g., more than two functions per key).

In some embodiments, the virtual buttons are configured at least in part based on the relative location of the user's hand. For example, when a user places hands and fingers near the input surface, their position is determined and sensor may be assigned according to the determined location of the hand/digits so that the virtual buttons are configured according to the location of the user's hands. In some embodiments, the virtual buttons may be assigned so that the user's fingers are at rest over a "home row" of keys (e.g., the user's digits are located over the a, s, d, f, j, k, l and ; keys) for a QWERTY keyboard. As a user's fingers may migrate during use and/or a user may reposition digits during use, a resting position of the user's digits may periodically be used to reassign the discrete input members and reconfigure the input device based on the new position of the digits. Accordingly, a dynamic keyboard/input device is provided.

Figure 1:
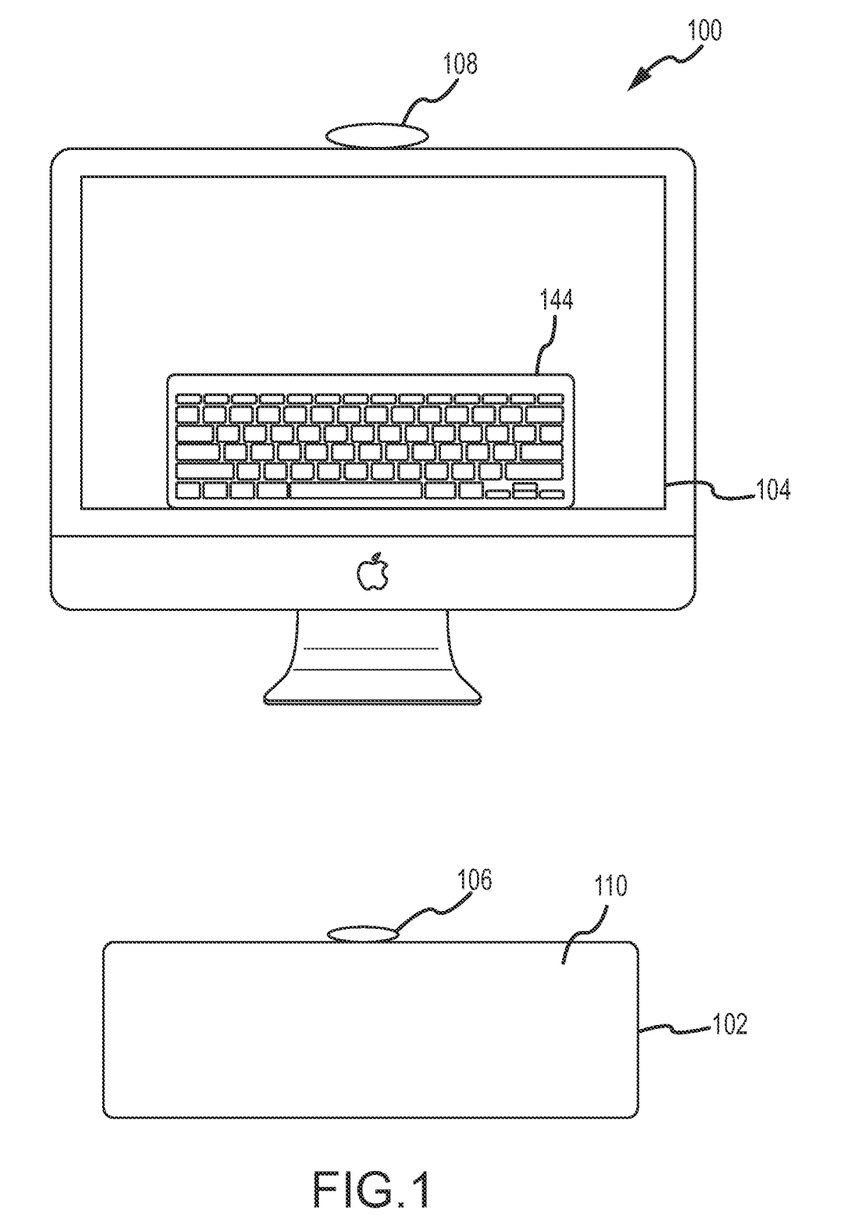
FIG. 1 illustrates a computer system including a configurable input device and providing an image of the configured input device on its display.

Turning to the drawings and referring initially to FIG. 1, a computer system 100 is illustrated in accordance with an example embodiment. As may be seen, the computer system 100 includes an input device 102, a display 104, and sensors 106 and 108. The input device 102 may communicate with the computer system 100 either wirelessly or via wires. In some embodiments, the input device 102 may take the form of a generally planar surface 110. Sensors 106 and 108 may be configured to sense proximity and/or location objects relative to the surface. For example, the sensors 106 and 108 may sense a user's hands/digits when they are near the input device 102. In some embodiments, the sensors 106 and 108 may take the form of light sensor (e.g., a camera), a proximity sensor (e.g., ultrasonic sensor), or the like. Additionally, in some embodiments, sensors may be located adjacent to and/or under the surface 110 to sense proximity, pressure and/or contact. As such, the sensors utilized for determining proximity of a user's hand, location of the user's digits, contact by the user and the like, may be located in and a part of the computer system 100 and/or may be external and/or separate from the computing device. It should be appreciated that in embodiments where the input devices are external to the computer system 100, the communication therebetween may be via wired or wireless communication channels (e.g., Bluetooth®, infrared, radio frequencies, or the like).

Figure 2:
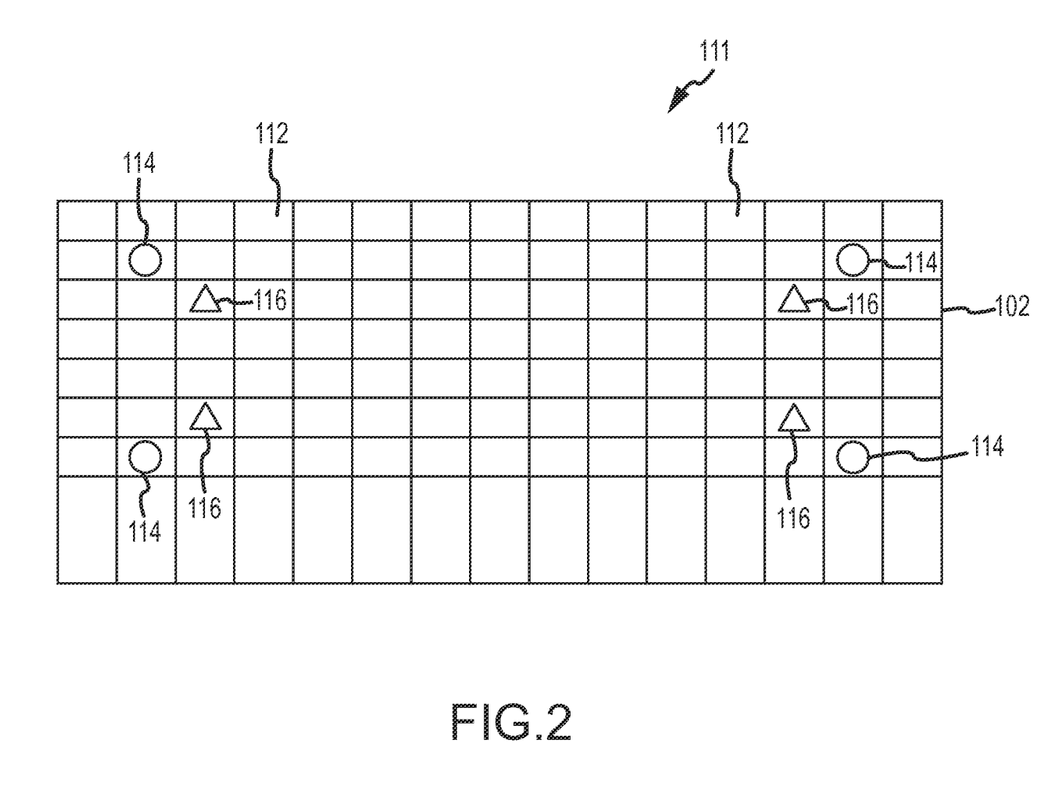
FIG. 2 illustrates an array of sensors in the configurable input device of FIG. 1.

FIG. 2 illustrates an array 111 of sensors 112 which may be configured to sense contact and/or pressure. For example, sensors 112 may take the form of capacitive touch sensors, pressure sensors and/or other types of sensors. Additionally, the array 111 may include multiple sensor types. For example, in addition to the pressure or contact sensors 112, one or more proximity sensors (such as ultrasonic sensors 114) may be distributed under the surface 110 and/or on or near the surface to sense when a hand is near the surface. One or more feedback devices (such as haptic devices 116) may also be distributed under the surface 110 to provide a user with feedback when input is received at the surface 110.

Figure 3:
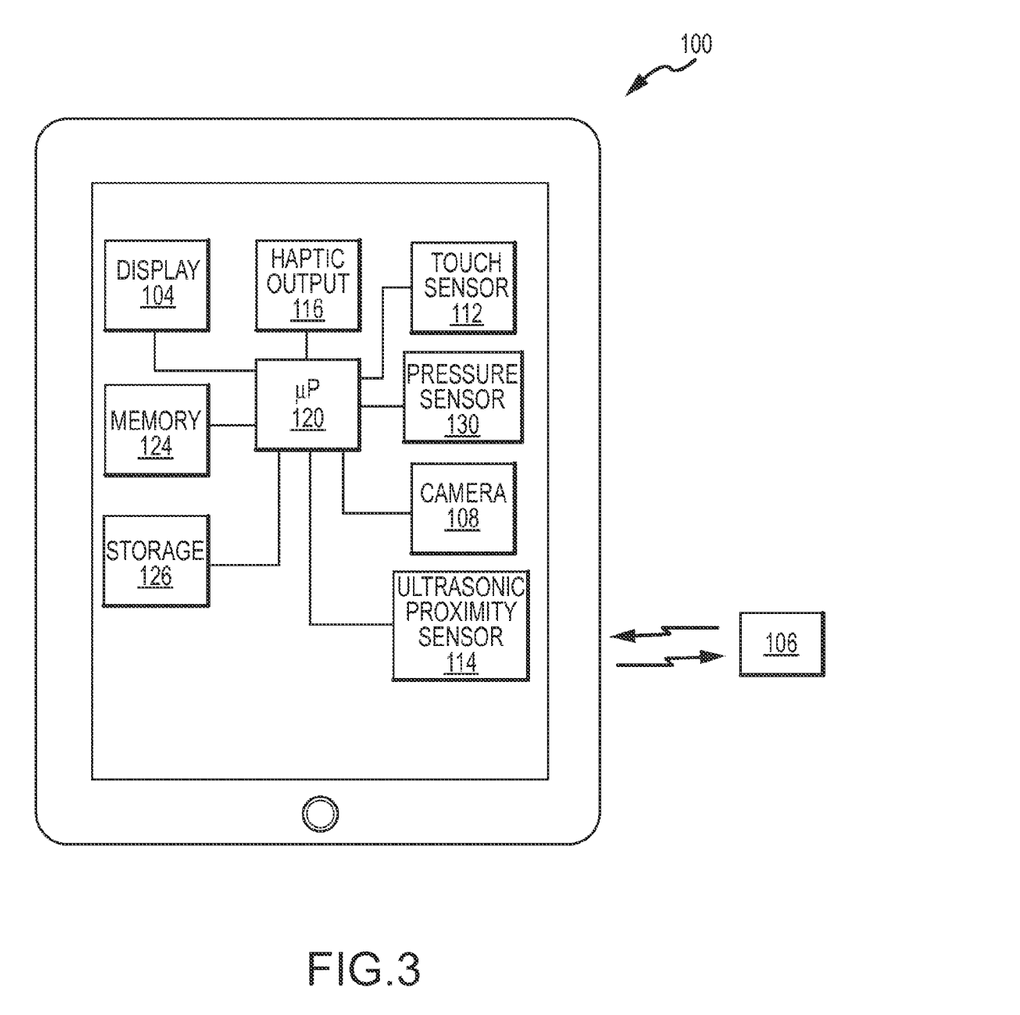
FIG. 3 is a block diagram of the computer system of FIG. 1.

FIG. 3 is a block diagram of the computer system 100. The computer system 100 includes a microprocessor 120 to which other components are communicatively coupled. In particular, the display 104, sensor 106, camera 108, touch sensor 112, proximity sensor 114, haptic feedback device 116, and pressure sensors 130 each may be coupled to the microprocessor 120. As shown, one or more sensors may be included in the computer system 100 and one or more sensors (e.g., sensor 106) may be external thereto. Data from the various sensors may be communicated to the computer system 100 via wires or wirelessly. Moreover, it should be appreciated that in some embodiments more or fewer components may be implemented and, further, that different components and/or sensors may be utilized.

In addition to the input and output devices, a memory 124 and storage 126 may each be coupled to the microprocessor 120 and provided in the computer system 100. The memory 124 may take any suitable form such as one or more types of random access memory (RAM). The storage 126 may also take any suitable form such as hard disk drive, solid-state hard drive, light based storage, magnetic based storage, and/or flash storage, for example. The memory 124 and storage 126 may store executable instructions for operation of the computer system 100 in .2accordance with the present techniques.

Figure 4:
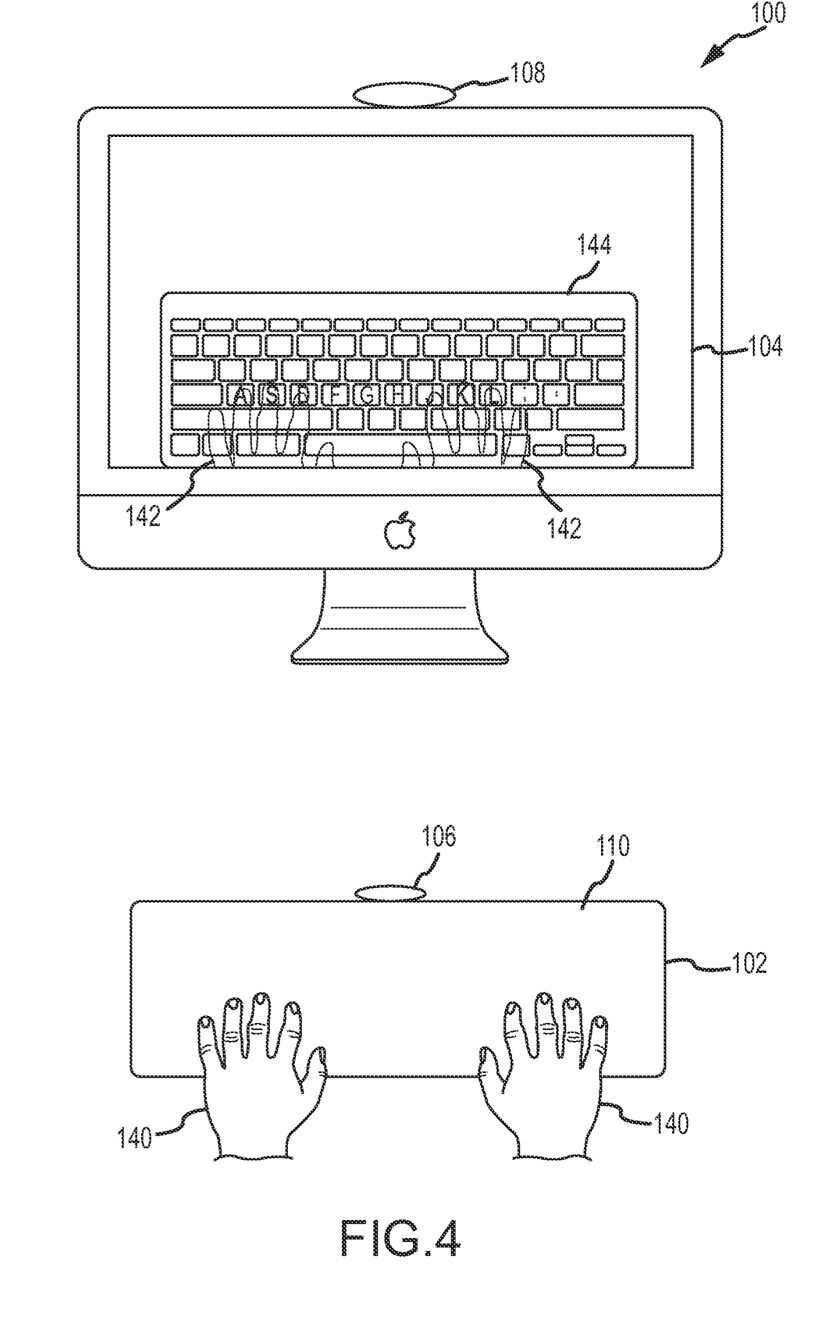
FIG. 4 illustrates a user's hands located proximately to the input device of FIG. 1 and an image of the user's hands being shown on the display of the computer system.

Turning to FIG. 4, the computer system 100 is illustrated with a user's hands 140 in proximity to the surface 110. When a user's hands/digits 140 are sensed as being proximately located to the surface 110, the location of the hands may be determined and an image of the hands 142 may be displayed on the display 106. In particular, the image of the hands 142 may be represented by a translucent image, an outline, a semi-transparent silhouette, or the like, so that an underlying image of the input device 142 may be viewed through the image of the hands.

Figure 5:
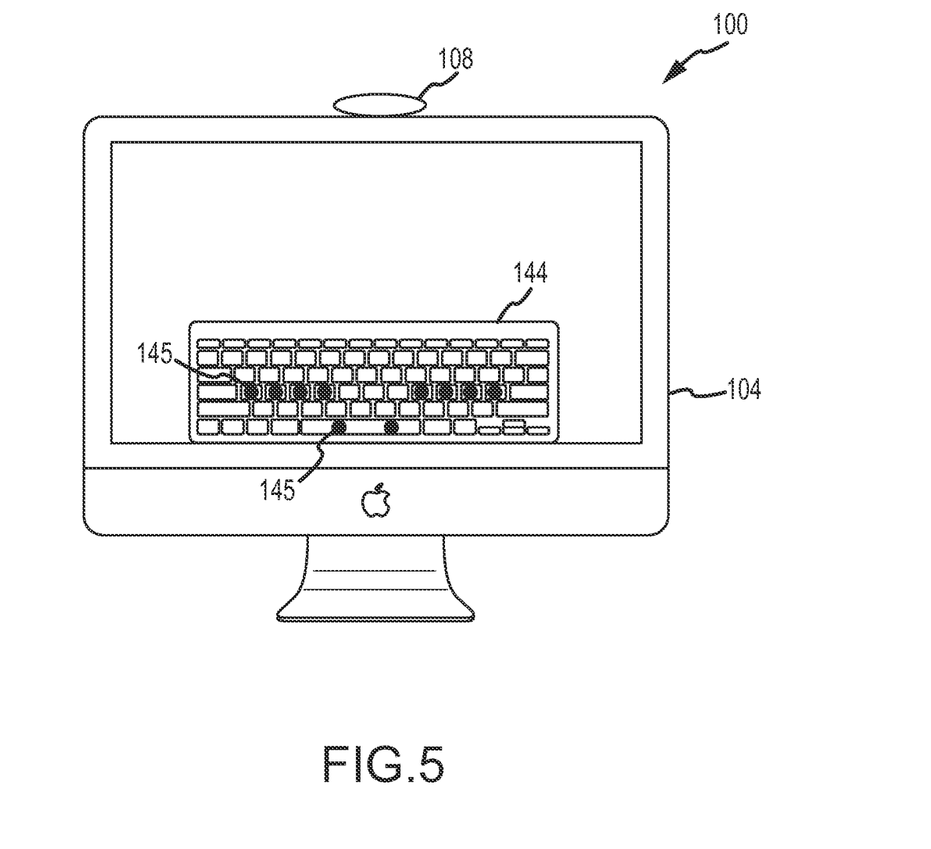
FIG. 5 illustrates the display of the computer system of FIG. 4 showing the location of the user's fingertips as ovals.

FIG. 5 illustrates an embodiment showing the user's digits (or fingertips) as ovals 145. In other embodiments, the location of the digits may be indicated by other shapes, images or the like, including fingertips, circles and so forth. Additionally, or alternatively, the location of the digits may be indicated by darkening and/or highlighting the virtual inputs over which the digits are located.

As may be appreciated, although the hands 140 may be angled and/or displaced relative to the surface 110, they may appear properly aligned on the display 106. In particular, in some embodiments, the image of the hand 142 may be aligned with virtual buttons in the image of the input device 142. For example, the digits may be aligned with a home row or other conventional configuration. Thus, the input device may be configurable to accommodate a more ergonomic arrangement for a user.

Figure 6:
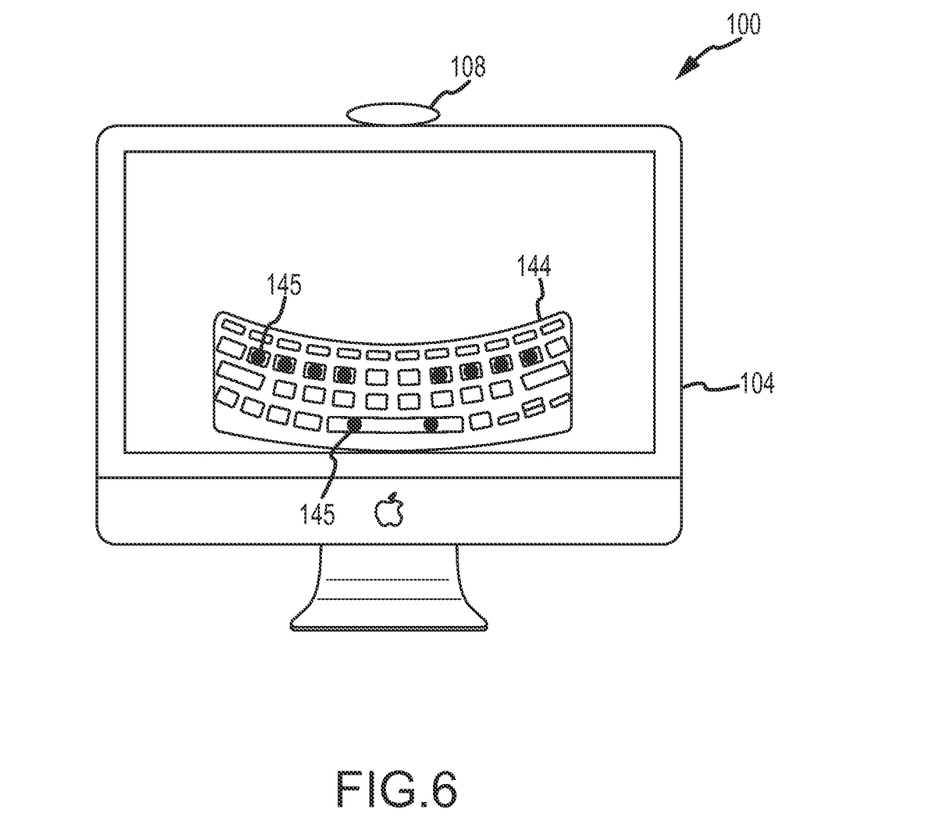
FIG. 6 illustrates a displayed virtual image device being altered to show a relative positioning of a user's digits and the inputs underlying the user's digits.

In some embodiments, the displayed input device may be adjusted/configured to show the position of the hands. FIG. 6 shows an example, of the virtual input device 144 as configured based on the location of the hands. Specifically, the virtual input device 144 is curved based on the user's hands 140 being angled relative to the input device 102.

To achieve configurability of the input device 102, input from the sensors 112 (FIG. 2) may be interpreted by software based at least upon a position of a user's digits. For example, one or more sensors 112 located near where a pinkie of the user's left hand may be configured to register as an "A" when input is received from those sensors. Further, sensors located near the user's ring finger may register an "S" and so forth. Hence, even if a user's hands are offset on the surface 110, angled or otherwise positionally skewed relative to each other, the user may provide input as if they were not offset from each other. That is, input may be interpreted based on a resting/starting position of the user's hands so that input may be entered without concern for the particular location of his/her hands relative to the surface 110. Rather, the user may simply view the virtual input device image 144 on the display with the overlaid image 142 showing the location of the user's digits relative to the virtual buttons displayed.

Figure 7:
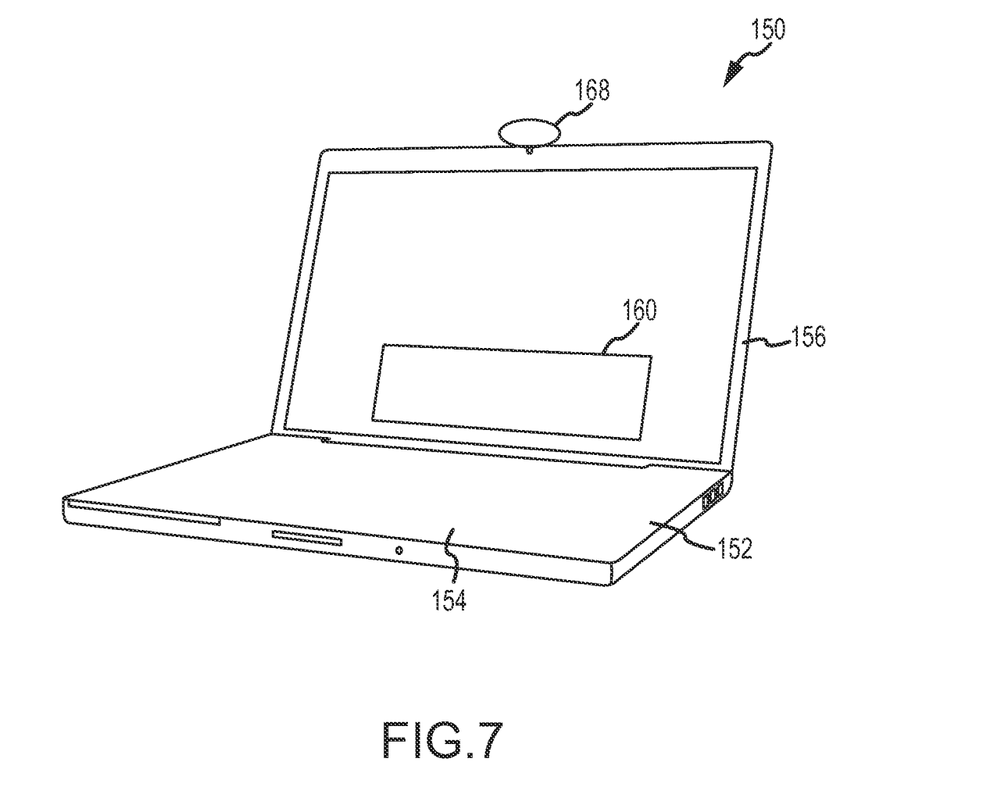
FIG. 7. illustrates a notebook computer system having a configurable input device and providing an image of the input device on its display in accordance with an alternative embodiment.

FIG. 7 illustrates a notebook computing device 150 in accordance with an alternative embodiment. The notebook computing device 150 has an input device 152 having an input surface 154 on which the user may enter input into the device. A display 156 is included and may show a virtual image of the input device 160. A camera 158 may be utilized to determine contact, proximity and/or position of a user's hand. Generally, the camera 158 may be utilized to determine the position of the user's hand relative to the input device 152. The positional information may be utilized in assignment/interpretation of the sensor input and to configure the virtual image of the displayed input device 160.

Figure 8:
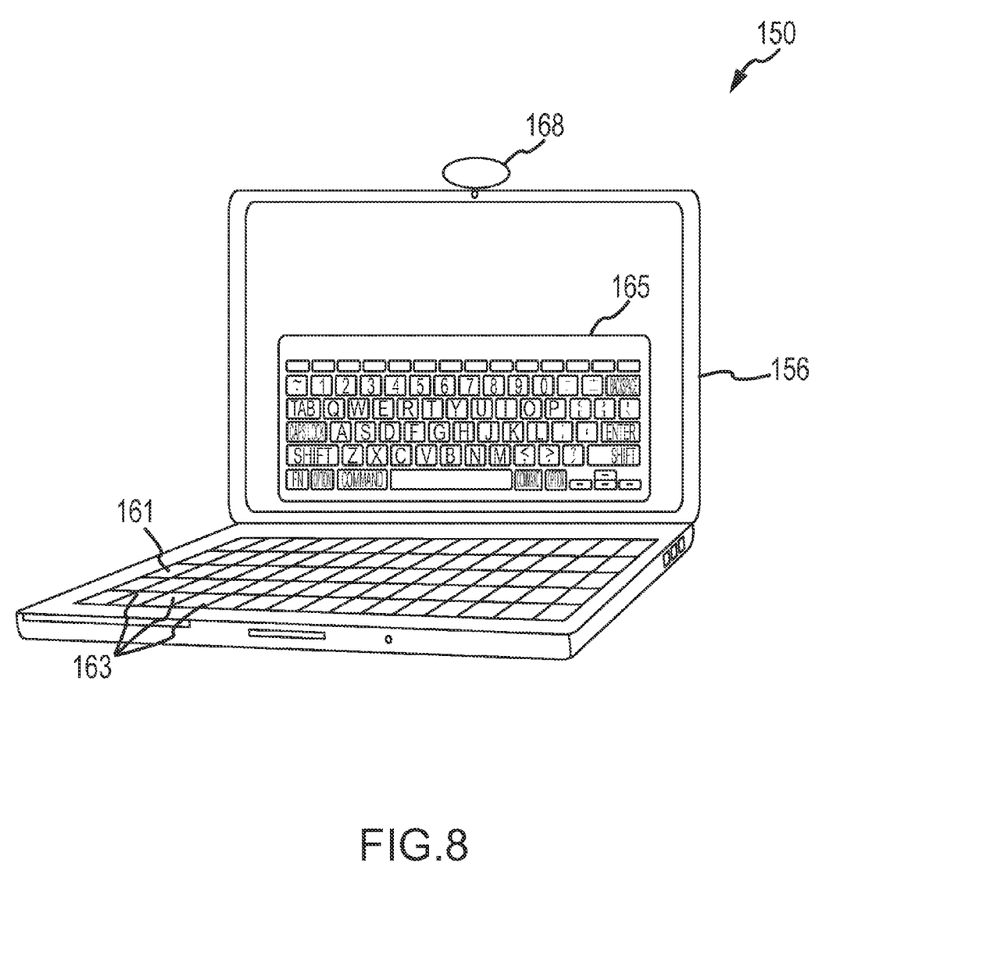
FIG. 8 shows the notebook computer of FIG. 7 having an array of unlabeled keys and a corresponding virtual keyboard displayed on its display.

FIG. 8 illustrates the notebook computing device 150 having an array 161 of input devices 163. In this embodiment, the input devices 163 may take the form of switches or keys which may sense the user's input. The input devices 163 may not have a legend. That is, the inputs devices 163 may not be labeled or have indicators thereon. Rather, a virtual image 165 on the display 156 will show an interpretation of the input of the input devices 163. For example, in some embodiments, the virtual image 165 may show a QWERTY keyboard 167. Once a user's hand comes into proximity with the array 161, the location of the specific letters of the QWERTY keyboard 167 may be configured relative to the positioning of the user's digits relative to the array 161 and the location of the user's fingertips may be shown over the virtual image 163.

Figure 9:
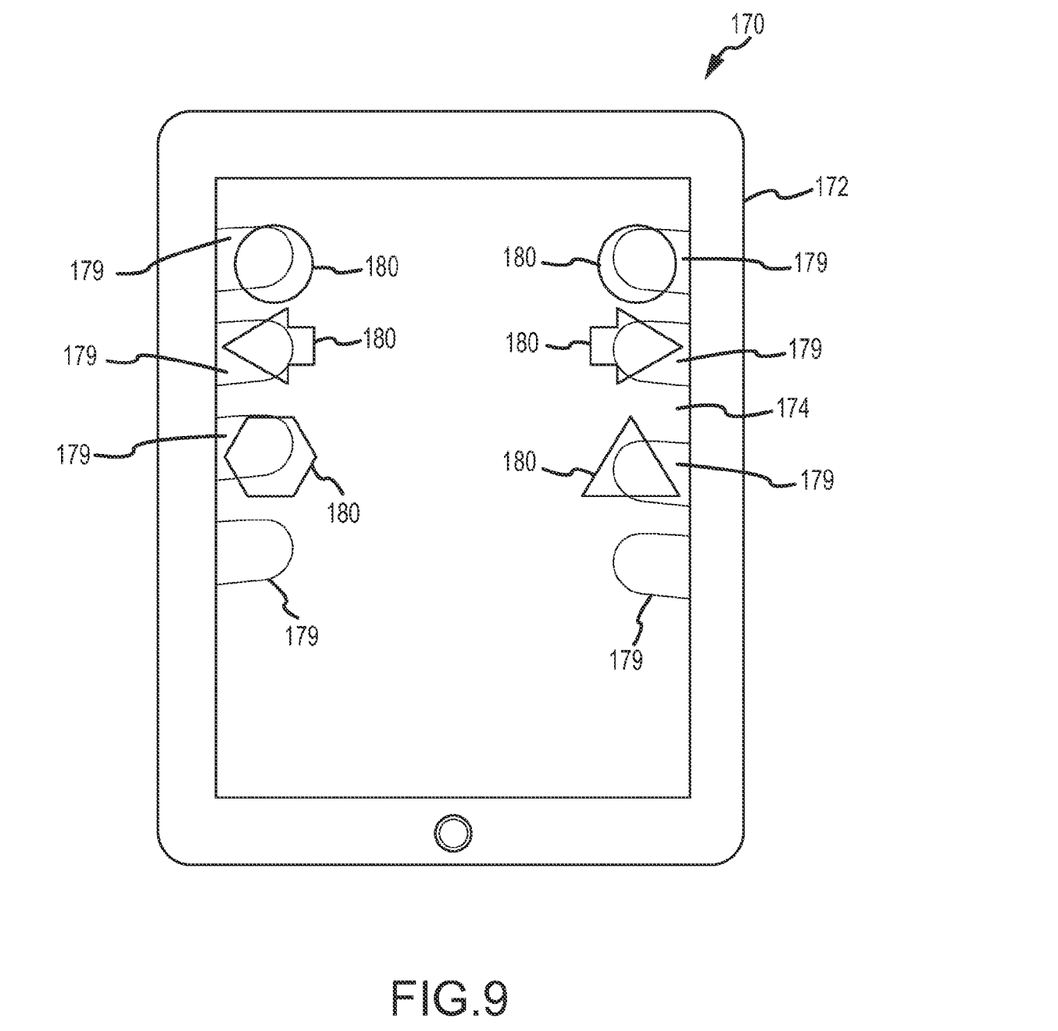
FIG. 9 illustrates a tablet computer system displaying configurable input devices and a user's hand position relative to the input devices in accordance with another embodiment.
Figure 10:
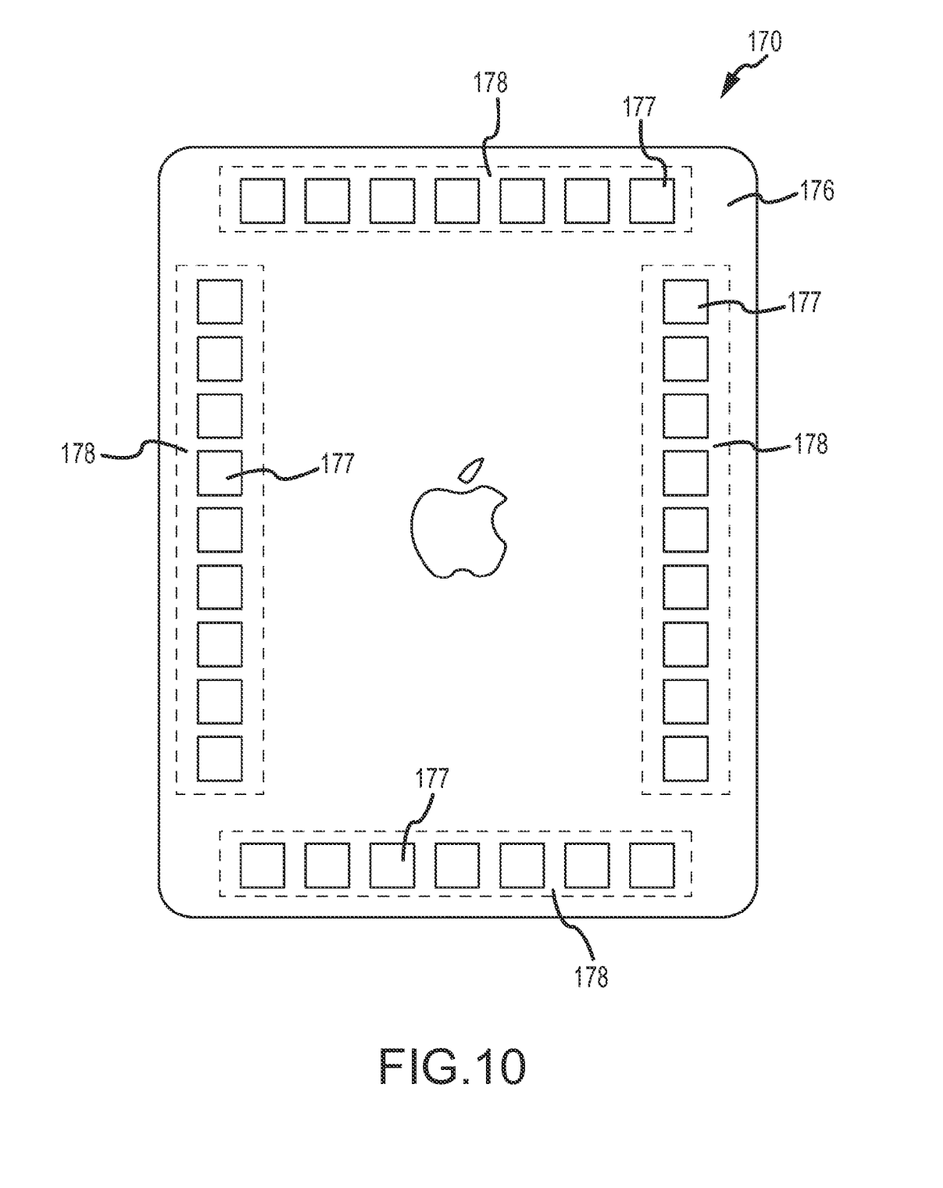
FIG. 10 illustrates a back side of the tablet computer system of FIG. 9 having sensor regions for user input.

FIG. 9 illustrates a tablet computer 170 in accordance with yet another embodiment. The tablet computer 170 has a front side 172 that includes a display 174. FIG. 10 shows a back side 176 of the tablet computer 170. Sensors 177 may be positioned in regions 178 under a surface of the perimeter of the backside 176 to facilitate input by a user. It should be appreciated that the sensors 177 may be positioned in a linear manner as shown, in a grid pattern, or any other suitable pattern and/or density to achieve a desired input granularity and/or functionality. It should be appreciated that the sensors for determining position and proximity of a user's hands may include ultrasonic, pressure, capacitive sensors, and/or the like. In some embodiments, one or more imaging devices may be implemented for positionally and/or proximity information.

The sensed position of the user's hands may be shown on the display 174 in some contexts. That is, in some operating contexts (e.g., when certain applications are running such as a video game) the showing of the user's fingers location may be beneficial, whereas in other contexts (e.g., when a movie is playing on the device 170) the display of the user's hands may be undesirable as it may distract from the content being displayed. Referring again to FIG. 9 images 179 representing the position of the user's fingers on the back side 176 may be shown on the display 174 as corresponding with certain virtual inputs 180.

Figure 11:
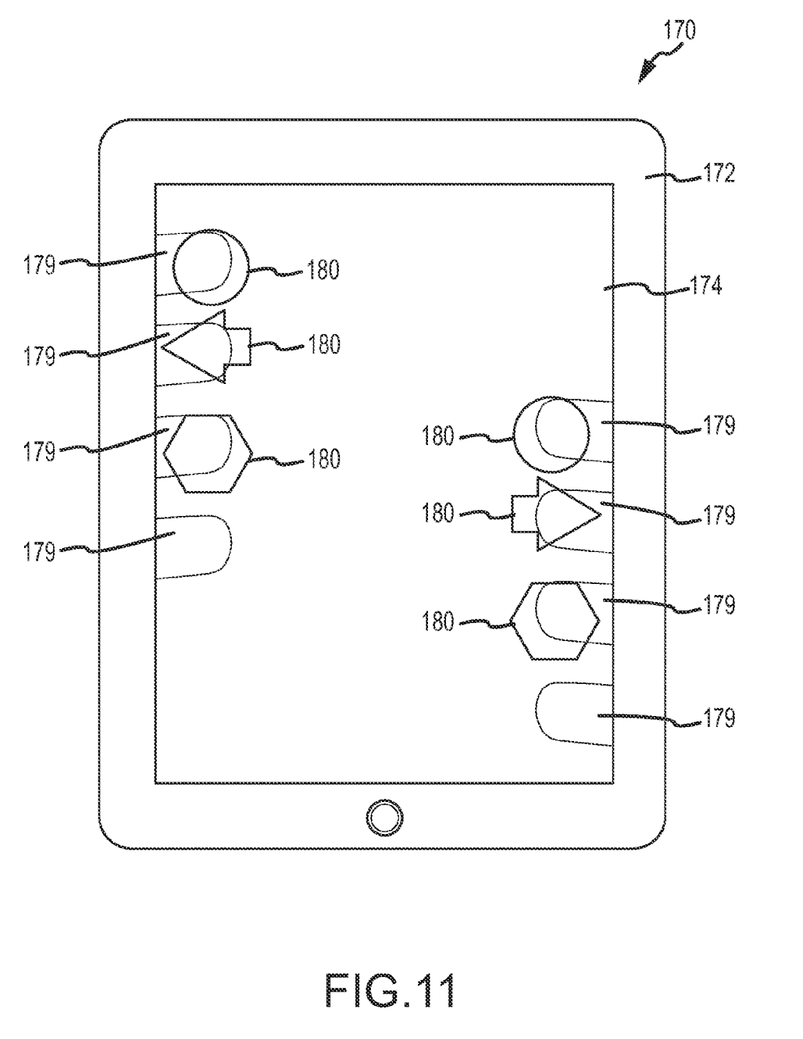
FIG. 11 illustrates the tablet computer system of FIG. 9 with the configurable input devices reconfigured according to the position of a user's hands.

As a user's hand positioning may shift or change during use, the virtual inputs may correspondingly shift as shown in FIG. 11. That is, if a user's hand moves during use, the move is sensed and the virtual inputs 180 are correspondingly changed to accommodate the shift of the hands. Generally, the assignment/interpretation of sensor input is reconfigured to compensate for the hand shift.

Figure 12:
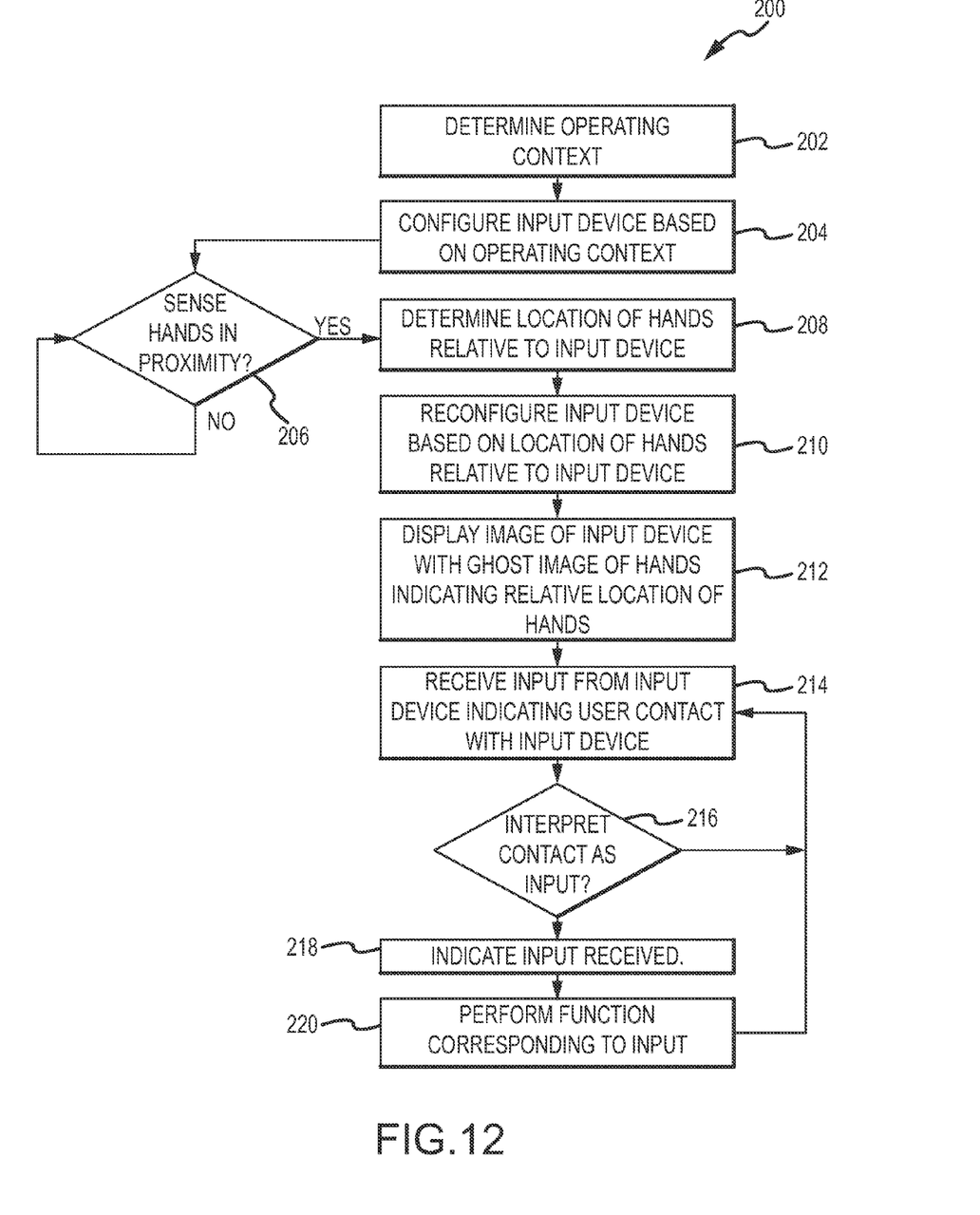
FIG. 12 is a flowchart illustrating a method of operating a computer system having configurable inputs.

FIG. 12 is a flowchart illustrating a method of operating a computer system to display both a virtual input and a user's hand position, as well as configuring the input based at least in part on the position of the user's hands. In some embodiments, the method 200 may begin with determining the operating context (Block 202). Once the operating context is determined, the input device is configured (Block 204). In particular, the operating context may be used to determine what type of virtual input device should be provided. For example, if a word processor is executing, a keyboard may be provided. However, if a game is being played, controls for the game may be provided. The provided configuration of the virtual input device may be based on a default configuration for a particular type of input device. That is, the discrete input members may be assigned to be interpreted as a particular character, icon, or other input based on a default location/position of the virtual inputs.

Periodically, or continuously, the system polls sensors to determine if a hand is in proximity with the input device of the system (Block 206). If no hand is present, the system may continue to poll. However, if hands are sensed in proximity to the system, the location of the hands may be determined relative to the input device (Block 208) and the virtual input device is reconfigured based on the location of the hands/digits relative to the input device (Block 210).

An image of the virtual input device with a ghost image indicating the relative location of the hands is displayed on the display (Block 212). As discussed above, discrete input devices of the virtual input device may be configured to accommodate the position of the user's hands/digits to help accommodate accurate and ergonomic data input. Moreover, the virtual input device may be reconfigured based on changed position of the hands/digits.

Signals received from the discrete input devices may indicate contact and/or input. As such, the system may receive input signals from the sensors indicating at least contact with the input surface (Block 214) and it is determined if the contact should be interpreted as input (Block 216). The determination as to whether contact is interpreted as input may be performed in one or more ways. For example, if a threshold pressure is exceeded, the contact may be interpreted as input, or if an applied pressure increases dramatically. Moreover, force sensors, push switches, capacitive tap sensors, and/or capacitive threshold sensors may be utilized to determine contact and/or input. With respect to the capacitive threshold sensors, pressure/input may be sensed based on a finger flattening out to generate more capacitance as more pressure is applied. Hence, when the capacitance equals or surpasses a threshold, the contact may be interpreted as input. Or, when the capacitances has a delta (or changes) greater than a threshold amount, it may be interpreted as input. Additionally, or alternatively, if pressure and/or contact is made by multiple digits simultaneously, the contact may not be interpreted as input as it may likely be the user just holding the system.

If contact is determined to be input, an indication that input was received may be provided (Block 218). For example, one or more haptic devices may provide haptic feedback to a user, an audible indicator may be provided, and/or the virtual input displayed on the display may indicate input by illuminating, darkening or generally changing characteristics of a particular virtual input button. Additionally, the system performs a function corresponding to the received input (Block 220).

The foregoing describes some example embodiments of systems and methods for providing and configuring a virtual input device based at least in part on a position of hands/digits of a user. Although the foregoing discussion has presented specific embodiments, persons skilled in the art will recognize that changes may be made in form and detail without departing from the spirit and scope of the embodiments. Accordingly, the specific embodiments described herein should be understood as examples and not limiting the scope thereof.

The invention claimed is:

1. A method of operating a computing system comprising:
determining an operational context of the computing system utilizing a processor of the system;
configuring an input device for the system based on the operational context, wherein the input device comprises a plurality of discrete input members;
displaying on a display a virtual image representative of the input device;
sensing a position of a user's digits relative to the input device;
reconfiguring the input device based on the sensed position of the user's digits, wherein reconfiguring the input device comprises:
assigning input received from at least one discrete input member of the input device based on a location of the at least one discrete input member relative to at least one of the user's digits; and
assigning inputs received from the remainder of the discrete input members of the input device based on the former assignment of the at least one discrete input member;
displaying on the display a reconfigured virtual image representative of the reconfigured input device; and
displaying on the display an image of the user's digits overlaying the reconfigured virtual image representative of the reconfigured input device,
wherein the input device is independent from the display.

2. The method of claim 1, wherein displaying the image of the user's digits overlaying the reconfigured virtual image representative of the reconfigured input device comprises displaying the reconfigured input device and the image of the user's digits in positions approximating the relative position of the user's digits to each other.

3. The method of claim 1, wherein displaying the image of the user's digits overlaying the reconfigured virtual image representative of the reconfigured input device comprises displaying the reconfigured input device and the user's digits so that the user's digits appear aligned with the reconfigured input device.

4. The method of claim 1, wherein displaying an image of the user's digits overlaying the reconfigured virtual image representative of the reconfigured input device comprises displaying the reconfigured virtual image representative of the reconfigured input device on a display located on a front side of the computer system and displaying an image of a sensed position of the user's digits on a backside of the computer system on the display located on the front side of the computer system.

5. The method of claim 1, wherein displaying the reconfigured virtual image representative of the reconfigured input device comprises aligning the display of the reconfigured virtual image with the sensed position of the user's digits.

6. The method of claim 1 further comprising:
sensing contact of the user's digits with the input device; and
determining if the contact is interpretable as input.

7. The method of claim 6, wherein if the contact is determined to be input:
indicating receipt of the input; and
performing a function indicated by the input.

8. The method of claim 7, wherein indicating receipt of the input comprises at least one of: generating a haptic feedback, altering an appearance of at least one of the discrete input members corresponding to the determined input, and generating an audible signal.

9. A computer system comprising:
an input device comprising:
a surface utilized for providing input to the computer in response to a user input;
a first sensor configured to determine a position of a user's hand relative to the surface; and
a second sensor configured to determine a touch of the user's hand on the surface;
a processor communicatively coupled with the input device, wherein the processor is adapted to:
assign input received from at least one discrete input member of a plurality of discrete input members of the input device based on a position of the user's hand; and
assign the remainder of the discrete input members based on the former assignment of the at least one discrete input member;
a memory communicatively coupled with the processor; and
a display in communication with the processor, wherein the display is configured to:
receive data from the processor;
provide a virtual image representative of the input device;
provide a reconfigured virtual image representative of the input device including the plurality of assigned discrete input members; and
provide a virtual image of the user's hand overlaying the reconfigured virtual image of the surface,
wherein the displayed, assigned discrete input members are aligned at least in part based on the determined position of the user's hand relative to the surface, and
wherein the surface of the input device is a separate surface from the display.

10. The computer system of claim 9, wherein the first sensor comprises a proximity sensor.

11. The computer system of claim 9, wherein the first sensor comprises a camera.

12. The computer system of claim 9, wherein the second sensor comprises a touch sensitive sensor.

13. The computer system of claim 9, wherein the second sensor comprises at least one of a pressure sensor or a force sensor.

14. The computer system of claim 9, wherein the computer system comprises a notebook computer.

15. The computer system of claim 9, wherein the computer system comprises a tablet computer.

16. A computer system comprising:
a processor;
a memory communicatively coupled to the processor;
a plurality of sensors communicatively coupled to the processor, the plurality of sensors configured to sense a position of one or more user's digits relative to a surface of an input device of the computer system and to sense an input from a user; and
a display communicatively coupled to the processor, wherein
the virtual input device comprises a plurality of discrete virtual buttons configured to correspond in location with the sensed position of the one or more user's digits;
the processor is adapted to assign input received from one or more sensors based on a position of a user's digit and to assign input received from one or more other sensors based on the former assignment of the one or more sensors;
the display configured to:
show an image representing a virtual input device of the input device and the one or more user's digits overlaying the image representing the virtual input device; and
display a reconfigured image representing the virtual input device including the assigned input based on the position of the user's digits and the assigned input based on the former assignment; and
wherein the surface of the input device is independent from the display.

17. The computer system of claim 16, wherein the plurality of sensors comprises an array of sensors distributed adjacent to the surface of the computer system.

18. The computer system of claim 16 further comprising a haptic feedback device configured to provide user feedback when user input is registered.

19. The computer system of claim 16 wherein the virtual buttons are reconfigured after at least one user digit is relocated relative to the plurality of sensors.

* * * * *